United States Patent
Chouhan et al.

(10) Patent No.: US 9,712,987 B2
(45) Date of Patent: Jul. 18, 2017

(54) PROVISIONING EMERGENCY SERVICES INFORMATION USING MAPPINGS AND EMERGENCY SERVICES TYPES

(71) Applicant: QUALCOMM Incorporated, San Diego, CA (US)

(72) Inventors: Bhanu Prakash Chouhan, Hyderabad (IN); Rajendra Prasad Nelurouth, Hyderabad (IN); Ankit Raj Garg, Hyderabad (IN); Venkata Durga Vinod Chikkala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/596,192

(22) Filed: Jan. 13, 2015

(65) Prior Publication Data
US 2016/0119766 A1 Apr. 28, 2016

Related U.S. Application Data

(60) Provisional application No. 62/068,591, filed on Oct. 24, 2014.

(51) Int. Cl.
*H04W 4/22* (2009.01)
*H04W 4/00* (2009.01)

(52) U.S. Cl.
CPC .............. *H04W 4/22* (2013.01); *H04W 4/001* (2013.01)

(58) Field of Classification Search
CPC . H04W 4/22; H04W 76/007; H04M 1/72536; H04M 2242/04; H04M 3/5116
See application file for complete search history.

(56) References Cited

U.S. PATENT DOCUMENTS

| | | | |
|---|---|---|---|
| 7,103,151 B2 | 9/2006 | Lass et al. | |
| 7,113,764 B1 | 9/2006 | Jang et al. | |
| 8,275,352 B2 | 9/2012 | Forstall et al. | |
| 2004/0185824 A1* | 9/2004 | Cheng | H04W 8/28 455/404.2 |
| 2012/0100824 A1* | 4/2012 | Michael | H04W 4/22 455/404.2 |
| 2015/0065077 A1* | 3/2015 | Kim | H04W 4/22 455/404.1 |

FOREIGN PATENT DOCUMENTS

| | | |
|---|---|---|
| EP | 1959659 A1 | 8/2008 |
| EP | 2161912 A2 | 3/2010 |

OTHER PUBLICATIONS

International Search Report and Written Opinion—PCT/US2015/048191—ISA/EPO—Oct. 16, 2015.

* cited by examiner

*Primary Examiner* — Curtis Odom
(74) *Attorney, Agent, or Firm* — Arent Fox LLP

(57) ABSTRACT

Systems, methods, apparatuses, and media for the provision of emergency services information are provided. Embodiments include receiving, by a mobile device, an emergency services information mapping table, the emergency services information mapping table comprising a plurality of entries, each entry of the plurality of entries comprising a mobile country code value, an emergency services telephone number value, and an emergency services type value. Embodiments include retrieving, by the mobile device, information from the emergency services information mapping table in response to an input from a user of the mobile device.

21 Claims, 10 Drawing Sheets

| | Mobile Country Code | Emergency Services Telephone Number | Emergency Services Type |
|---|---|---|---|
| 400 | | | |
| 402 | 310 | 911 | General Purpose Services |
| 404 | 404 | 100 | Police |
| 406 | 404 | 101 | Fire |
| 408 | 404 | 102 | Ambulance |
| 410 | 730 | 131 | Ambulance |
| 412 | 730 | 132 | Fire |
| 414 | 730 | 133 | Police |
| 416 | 214 | 112 | General Purpose Services |

| | Mobile Country Code | Emergency Services Telephone Number | Emergency Services Type |
|---|---|---|---|
| 400 | | | |
| 402 | 310 | 911 | General Purpose Services |
| 404 | 404 | 100 | Police |
| 406 | 404 | 101 | Fire |
| 408 | 404 | 102 | Ambulance |
| 410 | 730 | 131 | Ambulance |
| 412 | 730 | 132 | Fire |
| 414 | 730 | 133 | Police |
| 416 | 214 | 112 | General Purpose Services |

Figure 4

PROVISIONING EMERGENCY SERVICES INFORMATION USING MAPPINGS AND EMERGENCY SERVICES TYPES

CROSS-REFERENCE TO RELATED APPLICATION(S)

This application claims the benefit of U.S. Provisional Application Ser. No. 62/068,591, entitled "PROVISIONING EMERGENCY SERVICES INFORMATION USING MAPPINGS AND EMERGENCY SERVICES TYPES" and filed on Oct. 24, 2014, which is expressly incorporated by reference herein in its entirety.

BACKGROUND

Field

The present disclosure relates generally to communication systems and processes and, more particularly, to providing emergency services information on mobile devices.

Background

With standard mobile devices, a user may place a call to an emergency services provider. A user may be familiar with one or more telephone numbers associated with emergency services in a geographic area where the user regularly resides. In the case of an emergency, the user may dial from memory one of these emergency services telephone numbers. Additionally, a mobile device may have one or more emergency services telephone numbers stored permanently on a storage medium of the device. These permanently stored emergency services telephone numbers may be associated with a particular geographic area with which the mobile device is associated. In the case of an emergency, the user may press an emergency services dialing button provided on the device, to cause the mobile device to dial one of the emergency services telephone numbers stored on the device.

However, issues arise when the user travels with the mobile device to a geographic area where he does not regularly reside and with which the mobile device is not associated. In these situations, the user may not be familiar with telephone numbers for emergency services in that geographic area. Additionally, the mobile device may not have an emergency service telephone number stored on the device for that geographic area. Therefore, in the case of an emergency, the user may not be able to quickly dial an emergency services telephone number to contact appropriate emergency services.

SUMMARY

Various embodiments relate to systems, methods, apparatuses, and media for providing emergency services information on mobile devices.

According to embodiments of the present disclosure, a method for the provision of emergency services information is provided. The method includes receiving, by a mobile device, an emergency services information mapping table for storage on a mobile device, the emergency services information mapping table comprising a plurality of entries, each entry of the plurality of entries comprising a mobile country code value, an emergency services telephone number value, and an emergency services type value. The method further includes retrieving, by the mobile device, information from the emergency services information mapping table in response to an input from a user of the mobile device.

In some embodiments, the method includes providing the emergency services information mapping table on the mobile device prior to sale of the mobile device to an end user.

In some embodiments, the method further includes receiving an emergency services information mapping table update by the mobile device on a communication network.

In some embodiments, the method is provided so that the emergency services information mapping table includes a first entry of the plurality of entries and a second entry of the plurality of entries. The first entry of the plurality of entries corresponds to a telephone number entered by the user of the mobile device, the first entry comprising a mobile country code value, an emergency services telephone number value which is the telephone number entered by the user, and an emergency services type value. The second entry of the plurality of entries corresponds to a telephone number to be called, the second entry comprising a mobile country code value, an emergency services telephone number value which is the telephone number to be called, and an emergency services type value.

In some embodiments, the method further includes receiving a current mobile country code value from a communication network, the current mobile country code value corresponding to a geographic area in which the mobile device is currently located. The method may further include receiving a telephone number entered by the user of the mobile device. The method may further include determining that the current mobile country code value is different from a home mobile country code value stored on the mobile device. The method may further include searching the emergency services information mapping table for one or more first entries of the plurality of entries. Each of the one or more first entries may comprise a mobile country code value, an emergency services telephone number value, and an emergency services type value. The mobile country code value contained in each of the first entries may be the same as the home mobile country code value.

In some embodiments, the method further includes determining that the emergency services telephone number value contained in at least one of the first entries is the telephone number entered by the user. The method may further include searching the emergency services information mapping table for one or more second entries of the plurality of entries. Each of the one or more second entries may comprise a mobile country code value, an emergency services telephone number value, and an emergency services type value. The mobile country code value contained in each of the second entries may be the same as the current mobile country code value.

In some embodiments, the method further includes selecting a third entry from the one or more second entries and placing a call to the emergency services telephone number value contained in the third entry.

In some embodiments, the method further includes selecting the third entry comprising an emergency services type value that is the same as the emergency services type value contained in the at least one of the first entries.

In some embodiments, the method further includes determining that none of the one or more second entries contains an emergency services type value that is the same as the emergency services type value contained in the at least one of the first entries. The method may further include selecting the third entry comprising an emergency services type value that is a general purpose services type value.

In some embodiments, the method is provided so that placing a call to the emergency services telephone number value contained in the third entry includes providing requested service type information in a call setup information for the call to the emergency services telephone number value contained in the third entry. The requested service type information may correspond to the emergency services type value contained in the at least one of the first entries.

According to embodiments of the present disclosure, an apparatus for the provision of emergency services information is provided. The apparatus includes a mobile device having electronic storage comprising an emergency services information mapping table, the emergency services information mapping table comprising a plurality of entries, each entry of the plurality of entries comprising a mobile country code value, an emergency services telephone number value, and an emergency services type value. In such embodiments, the mobile device is configured to retrieve information from the emergency services information mapping table in response to an input from a user of the mobile device.

In some embodiments, the apparatus is provided so that the emergency services information mapping table is stored on the mobile device prior to sale of the mobile device to an end user.

In some embodiments, the apparatus is provided so that the mobile device is configured to receive an emergency services information mapping table update on a communication network.

In some embodiments, the apparatus is provided so that the emergency services information mapping table comprises a first entry of the plurality of entries and a second entry of the plurality of entries. The first entry of the plurality of entries may correspond to a telephone number entered by the user of the mobile device, the first entry comprising a mobile country code value, an emergency services telephone number value which is the telephone number entered by the user, and an emergency services type value. The second entry of the plurality of entries may correspond to a telephone number to be called, the second entry comprising a mobile country code value, an emergency services telephone number value which is the telephone number to be called, and an emergency services type value.

In some embodiments, the apparatus is provided so that the mobile device is configured to receive a current mobile country code value from a communication network, the current mobile country code value corresponding to a geographic area in which the mobile device is currently located. The mobile device may further be configured to receive a telephone number entered by the user of the mobile device. The mobile device may further be configured to determine that the current mobile country code value is different from a home mobile country code value stored on the mobile device. The mobile device may further be configured to search the emergency services information mapping table for one or more first entries of the plurality of entries. Each of the one or more first entries may comprise a mobile country code value, an emergency services telephone number value, and an emergency services type value. The mobile country code value contained in each of the first entries may be the same as the home mobile country code value.

In some embodiments, the apparatus is provided so that the mobile device is configured to determine that the emergency services telephone number value contained in at least one of the first entries is the telephone number entered by the user. The mobile device may further be configured to search the emergency services information mapping table for one or more second entries of the plurality of entries. Each of the one or more second entries may comprise a mobile country code value, an emergency services telephone number value, and an emergency services type value. The mobile country code value contained in each of the second entries may be the same as the current mobile country code value In some embodiments, the apparatus is provided so that the mobile device is configured to select a third entry from the one or more second entries. The mobile device may be further configured to place a call to the emergency services telephone number value contained in the third entry.

In some embodiments, the apparatus is provided so that the mobile device is configured to select the third entry from the one or more second entries by selecting the third entry that contains an emergency services type value that is the same as the emergency services type value contained in the at least one of the first entries.

In some embodiments, the apparatus is provided so that the mobile device is configured to determine that none of the one or more second entries contains an emergency services type value that is the same as the emergency services type value contained in the at least one of the first entries. The mobile device may further be configured to select the third entry from the one or more second entries in a way that includes selecting the third entry that contains an emergency services type value that is a general purpose services type value.

In some embodiments, the apparatus is provided so that the mobile device is configured to place a call to the emergency services telephone number value contained in the third entry in a way that comprises providing requested service type information in a call setup information for the call to the emergency services telephone number value contained in the third entry. The requested service type information may correspond to the emergency services type value contained in the at least one of the first entries.

According to embodiments of the present disclosure, an apparatus for the provision of emergency services information is provided. The apparatus includes means for receiving, by a mobile device, an emergency services information mapping table for storage on a mobile device, the emergency services information mapping table comprising a plurality of entries, each entry of the plurality of entries comprising a mobile country code value, an emergency services telephone number value, and an emergency services type value. The apparatus further includes means for retrieving, by the mobile device, information from the emergency services information mapping table in response to an input from a user of the mobile device.

In some embodiments, the apparatus further includes means for receiving, by the mobile device, a current mobile country code value from a communication network, the current mobile country code value corresponding to a geographic area in which the mobile device is currently located. The apparatus may further include means for receiving, by the mobile device, a telephone number entered by the user of the mobile device. The apparatus may further include means for determining that the current mobile country code value is different from a home mobile country code value stored on the mobile device. The apparatus may further include means for searching, by the mobile device, the emergency services information mapping table for one or more first entries of the plurality of entries. Each of the one or more first entries may comprise a mobile country code value, an emergency services telephone number value, and an emergency services type value. The mobile country code value contained in each of the first entries is the same as the home mobile country code value.

In some embodiments, the apparatus further includes means for determining that the emergency services telephone number value contained in at least one of the first entries is the telephone number entered by the user. The apparatus may further include means for searching, by the mobile device, the emergency services information mapping table for one or more second entries of the plurality of entries. Each of the one or more second entries may comprise a mobile country code value, an emergency services telephone number value, and an emergency services type value. The mobile country code value contained in each of the second entries may be the same as the current mobile country code value.

In some embodiments, the apparatus may further include means for selecting, by the mobile device, a third entry from the one or more second entries. The apparatus may further include means for placing, by the mobile device, a call to the emergency services telephone number value contained in the third entry.

In some embodiments, the apparatus may further include means for selecting, by the mobile device, the third entry from the one or more second entries in a way that includes selecting the third entry that contains an emergency services type value that is the same as the emergency services type value contained in the at least one of the first entries.

According to embodiments of the present disclosure, a non-transitory computer-readable medium for the provision of emergency services information is provided. The medium includes instructions configured to cause one or more computing devices to receive a current mobile country code value from a communication network, the current mobile country code value corresponding to a geographic area in which the mobile device is currently located. The medium may include instructions configured to cause the one or more computing devices to receive a telephone number entered by the user of the mobile device. The medium may include instructions configured to cause the one or more computing devices to determine that the current mobile country code value is different from a home mobile country code value stored on the mobile device. The medium may include instructions configured to cause the one or more computing devices to search the emergency services information mapping table for one or more first entries of the plurality of entries. Each of the one or more first entries may comprise a mobile country code value, an emergency services telephone number value, and an emergency services type value. The mobile country code value contained in each of the first entries may be the same as the home mobile country code value.

In some embodiments, the medium includes instructions configured to cause the one or more computing devices to receive a telephone number entered by a user of the mobile device. The medium includes instructions configured to cause the one or more computing devices to determine that the emergency services telephone number value contained in at least one of the first entries is the telephone number entered by the user. The medium may include instructions configured to cause the one or more computing devices to search the emergency services information mapping table for one or more second entries of the plurality of entries. Each of the one or more second entries may comprise a mobile country code value, an emergency services telephone number value, and an emergency services type value. The mobile country code value contained in each of the second entries may be the same as the current mobile country code value.

In some embodiments, the medium includes instructions configured to cause the one or more computing devices to receive a current mobile country code value from a communication network, the current mobile country code value corresponding to a geographic area in which the mobile device is currently located. The medium includes instructions configured to cause the one or more computing devices to search the emergency services information mapping table for one or more second entries of the plurality of entries, each of the one or more second entries comprising a mobile country code value, an emergency services telephone number value, and an emergency services type value. The mobile country code value contained in each of the second entries may be the same as the current mobile country code value.

In some embodiments, the medium includes instructions configured to cause the one or more computing devices to select a third entry from the one or more second entries and place a call to the emergency services telephone number value contained in the third entry.

In some embodiments, the medium is provided so that the medium comprises instructions configured to cause the one or more computing devices to select the third entry from the one or more second entries in a way that includes selecting the third entry comprising an emergency services type value that is the same as the emergency services type value contained in the at least one of the first entries.

BRIEF DESCRIPTION OF THE DRAWINGS

FIG. 4 is an exemplary emergency services information mapping table according to some embodiments of the present disclosure.

DETAILED DESCRIPTION OF EMBODIMENTS

Figure 1:
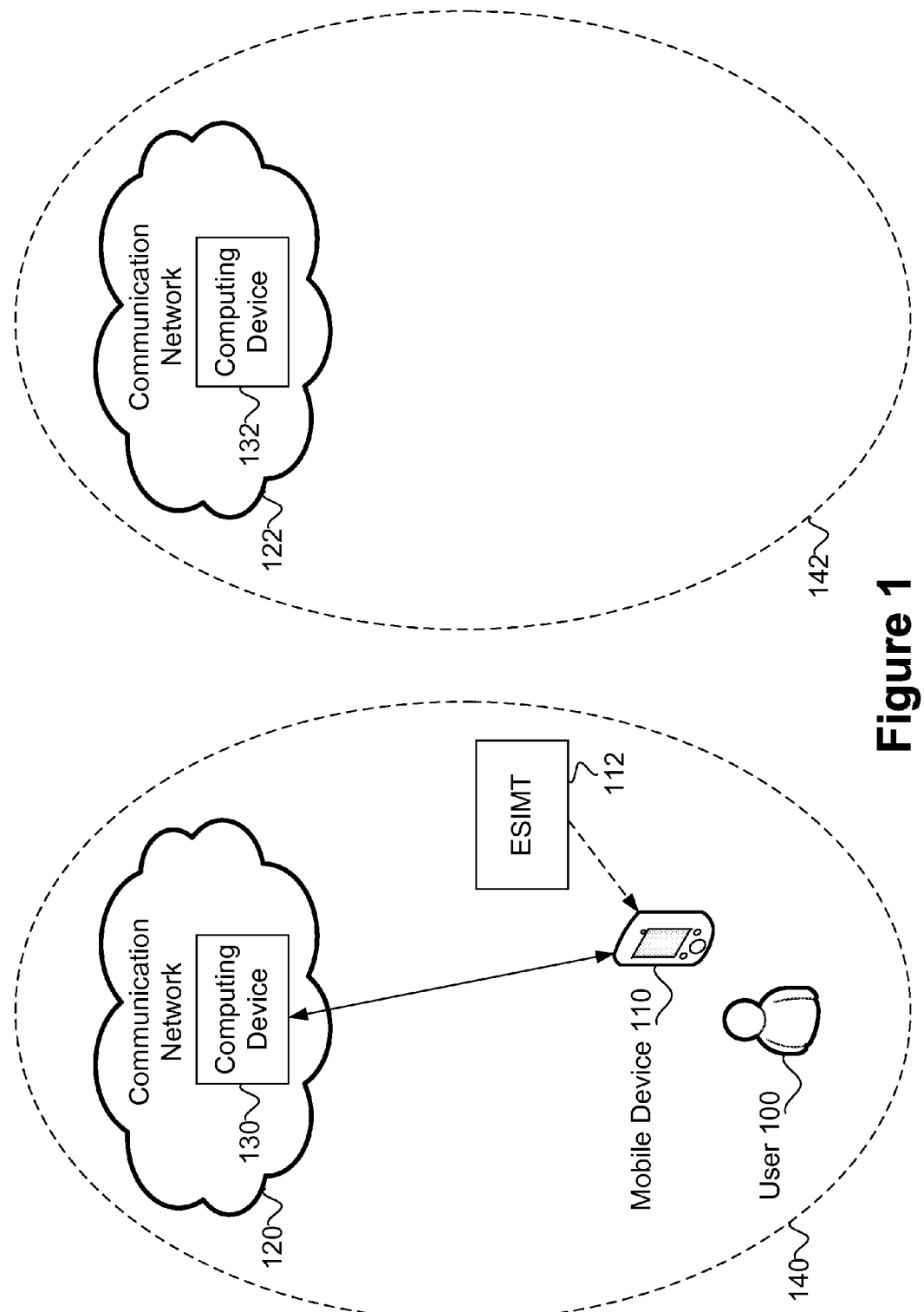
FIG. 1 is a diagram of a communication system according to some embodiments of the present disclosure.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with "processing electronics" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media include computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

With the techniques disclosed herein, embodiments of the present disclosure improve over existing cellular telephone technologies in numerous aspects. First, the user may be able to request appropriate emergency services based simply on information that the user already knows. In conventional systems, the user may not be able to request appropriate emergency services at all when necessary telephone number information is not known. Second, the user may be able to request the appropriate emergency services more quickly. For instance, in the case of a robbery, the user may be able to specifically contact police services for the country in which the user is present without delay or confusion in determining emergency services information. This may save time that could be critical to the user receiving timely assistance in this emergency situation. The user may similarly be able to provision ambulance, fire, or other appropriate emergency services in a more timely fashion using these embodiments.

FIG. 1 is a diagram of a communication system according to some embodiments of the present disclosure. A user 100, mobile device 110, communication networks 120 and 122, computing devices 130 and 132, and geographic areas 140 and 142 are shown.

Mobile device 110 may be provided in a variety of forms according to various embodiments of the present disclosure. Mobile device 110 may be any of a variety of mobile electronic devices that are capable of placing telephone calls. As such, mobile device 110 may be a mobile telephone, smartphone, cellular telephone, some other telephone, tablet computer, laptop computer, etc.

User 100 may be any form of user of mobile device 110 in various embodiments of the present disclosure. As such, user 100 may be an owner, regular user, intermittent user, etc. of mobile device 110.

Each of the communication networks 120 and 122 may include any suitable electronic communication network such as, but not limited to, a telephone network to which mobile device 110 may connect in order to place a telephone call. As such, the communication networks 120 and 122 may be cellular networks, CDMA networks, GSM networks, 3GPP networks, or the like.

Each of the computing device 130 may be provided in a variety of forms according to various embodiments of the present disclosure. Each computing device 130 and 132 may be any suitable device provided as part of or associated with the communication network 120, and that can communicate with mobile device 110. For example, the computing device 130 may be a gateway computing device, a mobile switching center ("MSC"), a base station controller ("BSC"), a radio network controller ("RNC"), an Evolved Node B ("eNodeB"), etc.

The geographic area 140 may be any geographic area with which communication network 120 is associated. As such, the geographic area 140 may be a particular country, a set of numerous countries, a subset of a country, etc. The geographic area 142 may be similarly defined with respect to communication network 122.

An emergency services information mapping table 112 may be stored on the mobile device 110. The emergency services information mapping table 112 may contain numerous entries. Each entry may have separate respective values for a mobile country code, an emergency services telephone number, and an emergency services type. The emergency services telephone number value may be a telephone number that can be dialed by the user or used directly by mobile device 110 to place a call to one or more associated emergency services. The emergency services type value may be a type or category of emergency services associated with the emergency service telephone number value. For example, the emergency services type value may be a predefined term or value that is associated with, indicates or represents one or more of: ambulance, police, fire fighting, general purpose services, or the like. A general purpose services type value may indicate that the associated emergency services telephone number value can be used for any type of emergency. The following are well known emergency services telephone numbers corresponding to a general purpose services type: 911 in United States, and 112 in Europe. The mobile country code ("MCC") value may be an MCC value used by a communication network as part of the public land mobile network ("PLMN") identifier. The MCC provided as part of a PLMN value from a communication network may indicate a country with which the communication network is associated. In emergency services information mapping table 112, the MCC value may indicate a country in which the associated emergency services telephone number is valid.

In some situations, the user 100 may place a telephone call to request emergency services based on an emergency services telephone number that the user had memorized. If the geographic area 140 is a geographic area where the user 100 regularly resides and with which the memorized emergency services telephone number is associated, then the mobile device 110 may be able to directly initiate a telephone call using the number memorized and dialed by the user 100.

Figure 2:
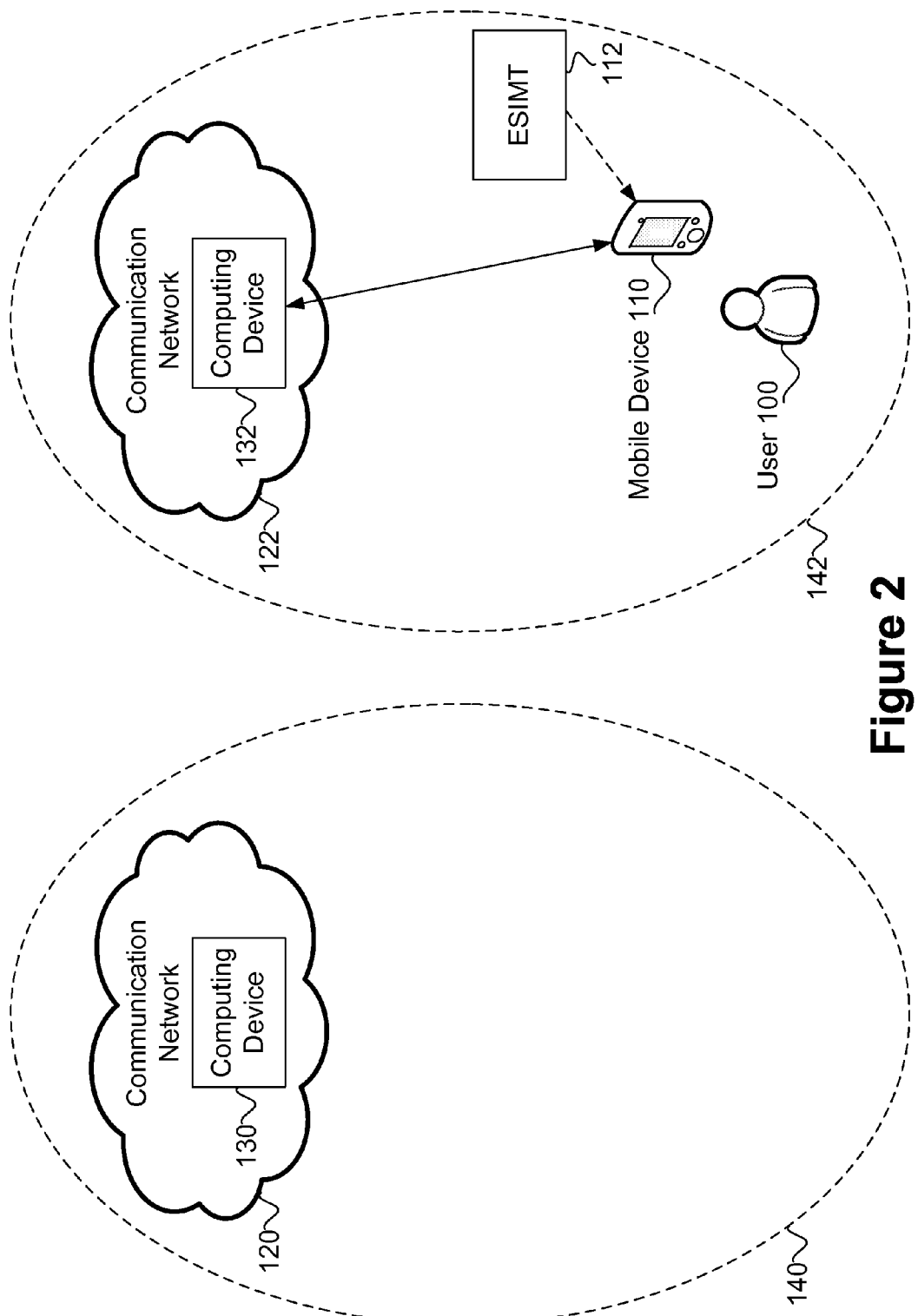
FIG. 2 is a diagram of a communication system according to some embodiments of the present disclosure.

However, when the user 100 moves the mobile device 110 to the geographic area 142, which is not a geographic area where the user 100 regularly resides, then the emergency services telephone number memorized and dialed by the user 100 may not be valid. This situation is shown in FIG. 2. In this situation, the mobile device 110 may use emergency services information mapping table 112 in order to initiate a telephone call to emergency services. In some embodiments, the mobile device 110 may use emergency services information mapping table 112 even in the geographic area 140 to initiate a telephone call to emergency services. Some exemplary uses of the emergency services information mapping table 112 for these purposes are described below.

An exemplary method for using the emergency services information mapping table 112 for initiating a telephone call to emergency services in the geographic area 142 and/or 140 is described with reference to FIGS. 1 and 2. When the user 100 dials a telephone number using the mobile device 110, the mobile device 110 may perform several actions in order to facilitate contacting emergency services. The mobile device 110 may search the emergency services information mapping table 112 to determine if the dialed telephone number is present in the table. If so, then the mobile device 110 has determined that the user is attempting to contact emergency services. The mobile device 110 may then compare the MCC value for the dialed telephone number (as retrieved from the emergency services information mapping table 112) to a home MCC value that had been pre-stored on the mobile device 110. If those values match, then the mobile device 110 has determined that the user has attempted to dial emergency services using a telephone number from the user's home country. The mobile device 110 may then search the emergency services information mapping table 112 to identify all entries that include an MCC value that matches a current MCC value that had been stored on the mobile device 110. For entries that are found in that search (i.e., entries that include an MCC value that matches the current MCC value), the mobile device 110 may retrieve (and dial or otherwise place a call to) one or more of the emergency services telephone numbers that are included in those entries. In particular embodiments, the mobile device 110 may retrieve (and dial or otherwise place a call to) an emergency services telephone number included in a selected one of those entries, where that selected entry has an emergency services type value that matches the emergency services type value for the telephone number dialed by the user 100. Using this approach, the user 100 need only remember and dial an emergency services telephone number for his home country or geographic region in order to be connected with a similar type of emergency services in another country or geographic region in which the user is located.

The emergency services information mapping table 112 may be provided on the mobile device 110 in any suitable manner. For example, the emergency services information mapping table 112 may be stored on the mobile device 110, prior to sale of the mobile device 110 to an end user. In this way, the emergency services information mapping table 112 may be provided as part of software installed on the mobile device 110 prior to or at the time the mobile device is purchased or otherwise obtained by the user. In particular embodiments, the emergency services information mapping table 112 may be provided on the mobile device 110 as a default table that can be updated at a later point. In further embodiments, the emergency services information mapping table 112 may be provided on a removable non-transient, electronic storage medium that the user 100 can install in the mobile device 110. The emergency services information mapping table 112 may be updated by wireless communication over the communication networks 120, 122. Emergency services information mapping table updates may be transmitted over the communications networks 120, 122, form computing devices 130, 132, in a variety of situations or upon one or more predefined events. For example, an emergency services information mapping table update may be transmitted when one or more of the emergency services telephone numbers for one or more of the geographic areas 140, 142 are changed. As another example, an emergency services information mapping table update may be transmitted when the mobile device 110 enters or reenters the geographic area with which a communication network is associated. In other embodiments, the emergency services information mapping table 112 may be provided on the mobile device 110 in other suitable manners.

In some embodiments the mobile device 110 may map between emergency services type values. As described above, the mobile device 110 may be configured to search the emergency services information mapping table 112 to determine whether any table entries that include the current MCC also include an emergency services type value that matches the emergency services type value associated with the number dialed by the user 100. However, a table entry that includes both the current MCC and a matching emergency services type value may not exist in the table stored on the mobile device 110). In such cases, the mobile device 110 may be configured to map between emergency services type values to select an emergency services telephone number to dial for the current MCC. For example, where the user 100 dials a telephone number for one of ambulance, police, or fire, but the current geographic area only has a general purpose services telephone number, the mobile device 110 may select the emergency services telephone number corresponding to the general purpose services type value. A variety of other pre-defined mappings between emergency services type values may be used in other embodiments.

In some embodiments, the mobile device 110 may include requested service type information in or with call setup information for a call to an emergency services telephone number. As described above, the mobile device 110 may be configured to map across service types in predefined cases. For example, the mobile device 110 may have additional information about the attempted call from user 100, where such additional information could be of assistance in provisioning emergency services to the user 100. For example, the mobile device 110 may be configured to provide requested service type information that corresponds to the emergency services type for the number dialed by the user. As an example, if the user 100 dials an emergency services telephone number for ambulance services, but the current geographic area only has a general purpose services telephone number, the mobile device 110 may be configured to place a call to the general purpose services telephone number but also provide additional information with the call, where such additional information may include indicia indicating that the service desired by the user 100 is ambulance services. This may assist the contacted emergency services entity to provide the desired service to the user 100, relatively quickly. Other forms of requested service type information may be provided in other embodiments.

Figure 3:
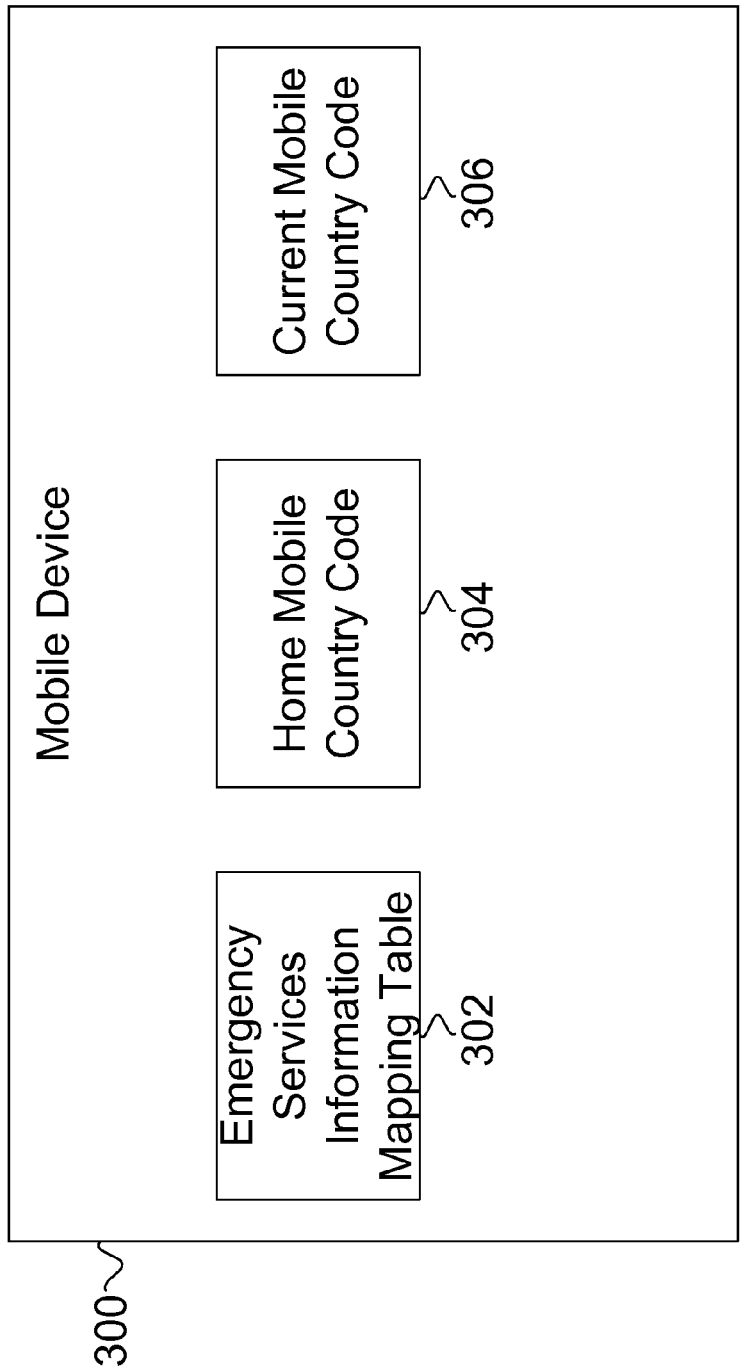
FIG. 3 is a block diagram showing elements of a mobile device according to some embodiments of the present disclosure.

FIG. 3 is a block diagram showing elements of a mobile device 300 according to certain embodiments. The mobile device 300 may correspond to various mobile devices described herein, such as mobile device 110. The mobile device 300 contains an emergency services information mapping table 302, a home mobile country code 304, and a current mobile country code 306. The emergency services information mapping table 302 may correspond to emergency services information mapping tables described herein. For example, the emergency services information mapping table 302 may contain a plurality of entries, with each entry containing a mobile country code value, an emergency services telephone number value, and an emergency services type value.

The home mobile country code 304 may be an MCC value that corresponds to a home country for the mobile device 300. A home country may be a country in which the mobile device 300 and its user are based or usually located. The mobile device 300 may be provided with domestic cellular telephone service in the home country. A user of mobile device 300 would likely be familiar with the emergency services telephone numbers that are valid in the home country.

In contrast to the home mobile country code 304, the current mobile country code 306 may be an MCC value that corresponds to a current country or other geographic region in which the mobile device 300 is located. The mobile device 300 may occasionally check the PLMN values (each containing an MCC value) transmitted by communication networks within range of the mobile device 300. The mobile device 300 may then compare the MCC values contained in the PLMN value to the current mobile country code 306. If the values do not match, then the most recently received MCC value may be stored as the current mobile country code 306. In this way, the mobile device 300 may store the MCC value for the geographic area in which the mobile device 300 is currently located, where that stored MCC value is the "current MCC" value for the mobile device 300.

The emergency services information mapping table 302, the home mobile country code 304, and the current mobile country code 306 may be provided to and stored on the mobile device 300, in any suitable manner. That information may be stored in a non-volatile memory of the mobile device 300. Some of that information may be stored in a non-volatile memory of the mobile device 300 while other portions of that information are stored in a volatile memory of the mobile device 300. For example, the emergency services information mapping table 302 may be stored in a non-volatile hard drive of the mobile device 300, a home mobile country code 304 may be stored on a non-volatile subscriber identity module ("SIM") card installed in the mobile device 300, and a current mobile country code 306 may be stored in volatile memory of the mobile device 300. As another example, the emergency services information mapping table 302 may be stored in the EFS partition portion of a non-volatile storage device associated with the mobile device 300. Other manners of storing or otherwise providing that information on the mobile device 300 are employed in other embodiments.

FIG. 4 is an exemplary emergency services information mapping table 400 according to certain embodiments. Emergency services information mapping table 400 contains a plurality of entries 402, 404, 406, 408, 410, 412, 414, and 416. As shown, each entry of the emergency services information mapping table 400 contains a mobile country code value, an emergency services telephone number value, and an emergency services type value. The entry 402 identifies the United States of America with an MCC value: 310. A corresponding general purpose services telephone number 911 is included as part of the entry 402. Each of the entries 404, 406, and 408 identify India with an MCC value: 404. Emergency services telephone numbers in India for police, fire, and ambulance emergency services types are shown for entries 404, 406 and 408, respectively. Entries 410, 412, and 414 identify Chile with an MCC value of 730. Emergency services telephone numbers in Chile for ambulance, fire, and police emergency services types are shown for entries 410, 412 and 414, respectively. Entry 416 identifies Spain with an MCC value of 214. An emergency services telephone number in Spain for general purpose services emergency services type is shown in the entry 416. Emergency services information mapping table 400 may correspond to any of the emergency services information mapping table discussed herein. While emergency services information mapping table 400 includes entries for four MCC values (e.g., four different countries or other geographic regions), it should be understood that the emergency services information mapping table of other embodiments may contain fewer or more entries than shown in FIG. 4, corresponding to fewer or more countries (or other geographic regions) than the table of FIG. 4. Also, in further embodiments, the emergency services information mapping table 400 may contain fewer or more entries for fewer or more emergency services types than the table in FIG. 4. Other suitable modifications and extensions to emergency services information mapping table 400 may be included in other embodiments.

Figure 5:
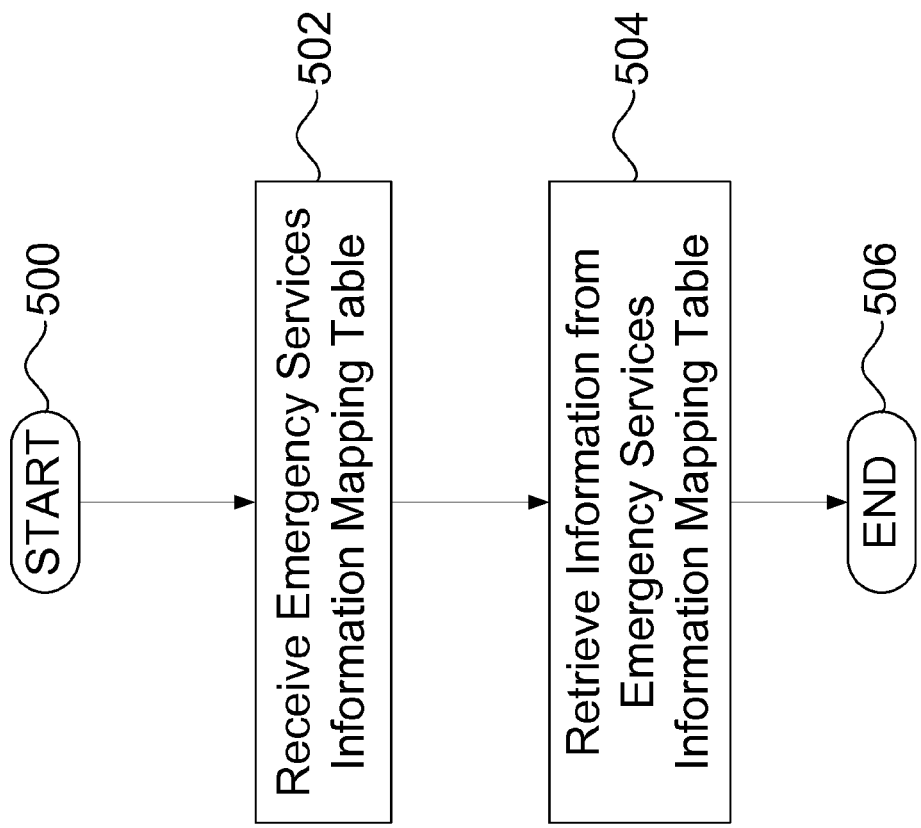
FIG. 5 is a flowchart of a process for provisioning emergency services information according to some embodiments of the present disclosure.

FIG. 5 is a flowchart of a process for provisioning emergency services information according to certain embodiments. The process of FIG. 5 may be performed by a mobile device, such as mobile device 110 or mobile device 1000. The process in FIG. 5 starts at block 500.

At block 502, an emergency services information mapping table as described is received. For example, the emergency services information mapping table may include entries, where each entry includes a mobile country code value, an emergency services telephone number value, and an emergency services type value. The emergency services information mapping table may be received in any suitable manner. For example, the emergency services information mapping table may be received by receiving an electronic file containing information included in the emergency services information mapping table. The emergency services information mapping table may be received by a mobile device receiving a memory card, SIM card, or other storage device at a data port of the mobile device, the emergency services information mapping table being stored on the memory card, SIM card, or other storage device. The emergency services information mapping table may be received by a mobile device retrieving the emergency services information mapping table from a memory card, SIM card, or other storage device on which the emergency services information mapping table is stored. The emergency services information mapping table may be received by a mobile device over-the-air from a computing device of a communication network with which the mobile device is in communication. The emergency services information mapping table may be received in a variety of other ways in various embodiments of the present disclosure.

At block 504, information is retrieved from an emergency services information mapping table. Information may be retrieved from the emergency services information mapping table in a variety of ways. For example, information may be retrieved from the emergency services information mapping table as part of a mobile device searching the emergency services information mapping table for a telephone number dialed by a user of the mobile device. Information may be retrieved from the emergency services information mapping table as part of a mobile device searching the emergency services information mapping table for one or more telephone numbers corresponding to a current mobile country code. Information may be retrieved from the emergency services information mapping table as part of a mobile device placing a call to a telephone number based on selecting an entry from the emergency services information mapping table. Information may be retrieved from the emergency services information mapping table based on input from a user of a mobile device. For example, the mobile device may retrieve information from the emergency services information mapping table based on the user dialing a telephone. Information may be retrieved from the emergency services information mapping table in a variety of other ways in various embodiments of the present disclosure.

The process ends at block 506.

Figure 6:
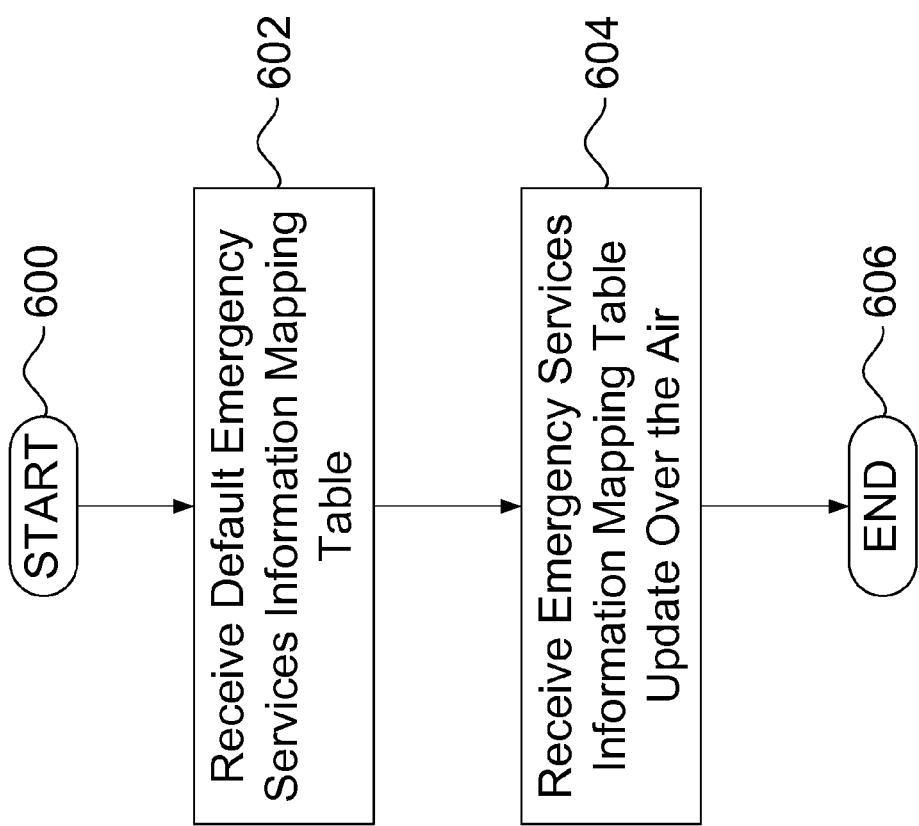
FIG. 6 is a flowchart of a process for provisioning emergency services information according to some embodiments of the present disclosure.

FIG. 6 is a flowchart of a process for provisioning emergency services information according to some embodiments of the present disclosure. The process of FIG. 6 may be performed by a mobile device, such as mobile device 110 or mobile device 1000. The process starts at block 600.

At block 602, a default emergency services information mapping table is received. The default emergency services information mapping table may be an emergency services information mapping table as described elsewhere in the present disclosure. The default emergency services information mapping table may be received by a mobile device receiving a memory card, SIM card, or other storage device at a data port of the mobile device, the default emergency services information mapping table being stored on the memory card, SIM card, or other storage device. The default emergency services information mapping table may be received by a mobile device retrieving the default emergency services information mapping table from a memory card, SIM card, or other storage device on which the default emergency services information mapping table is stored. The default emergency services information mapping table may be received by a mobile device over-the-air from a computing device of a communication network with which the mobile device is in communication. The default emergency services information mapping table may be received in a variety of other ways in various embodiments of the present disclosure.

In some embodiments, a mobile device that receives the default emergency services information mapping table at block 602 may additionally store the default emergency services information mapping table. The default emergency services information mapping table may be stored on a memory device of the mobile device. The default emergency services information mapping table may be stored on a removable media that may be installed in a mobile device. The default emergency services information mapping table may be stored on the mobile device prior to sale of the mobile device to an end user. This may be advantageous as a way to allow the emergency services information provisioning techniques of the present disclosure from the initial use of the mobile device by the end user. The default emergency services information mapping table may be stored in a variety of other ways in various embodiments of the present disclosure.

At block 604, an emergency services information mapping table update is received by the mobile device over the air. The emergency services information mapping table update may be a command received from a node of the communication network that instructs as to a change that should be made to the emergency services information mapping table stored on the mobile device. For example, the emergency services information mapping table update may include an entry (consisting of MCC, emergency services telephone number, emergency services type, for example) and a modification command. The modification command may be, for example DELETE or ADD. More than one emergency services information mapping table update may be received in order to make updates to the emergency services information mapping table stored on the mobile device. The emergency services information mapping table update may be received as part of broadcast control message received by all mobile devices within range of a base station of the communication network. The emergency services information mapping table update may be received based on a query from the mobile device to a computing device of a communication network. The query may specify a last date of update, in response to which, the communication network may provide emergency services information mapping table updates for all changes to the emergency services information mapping table information after the last date of update. The query may specify a last date of update for a particular MCC or country, in response to which, the mobile device may receive from the communication network emergency services information mapping table updates for all changes to the emergency services information mapping table information for the specified MCC or country after the last date of update. The emergency services information mapping table updates may be received over the air in a variety of other ways in various embodiments of the present disclosure.

The process ends at block 606.

Figure 7:
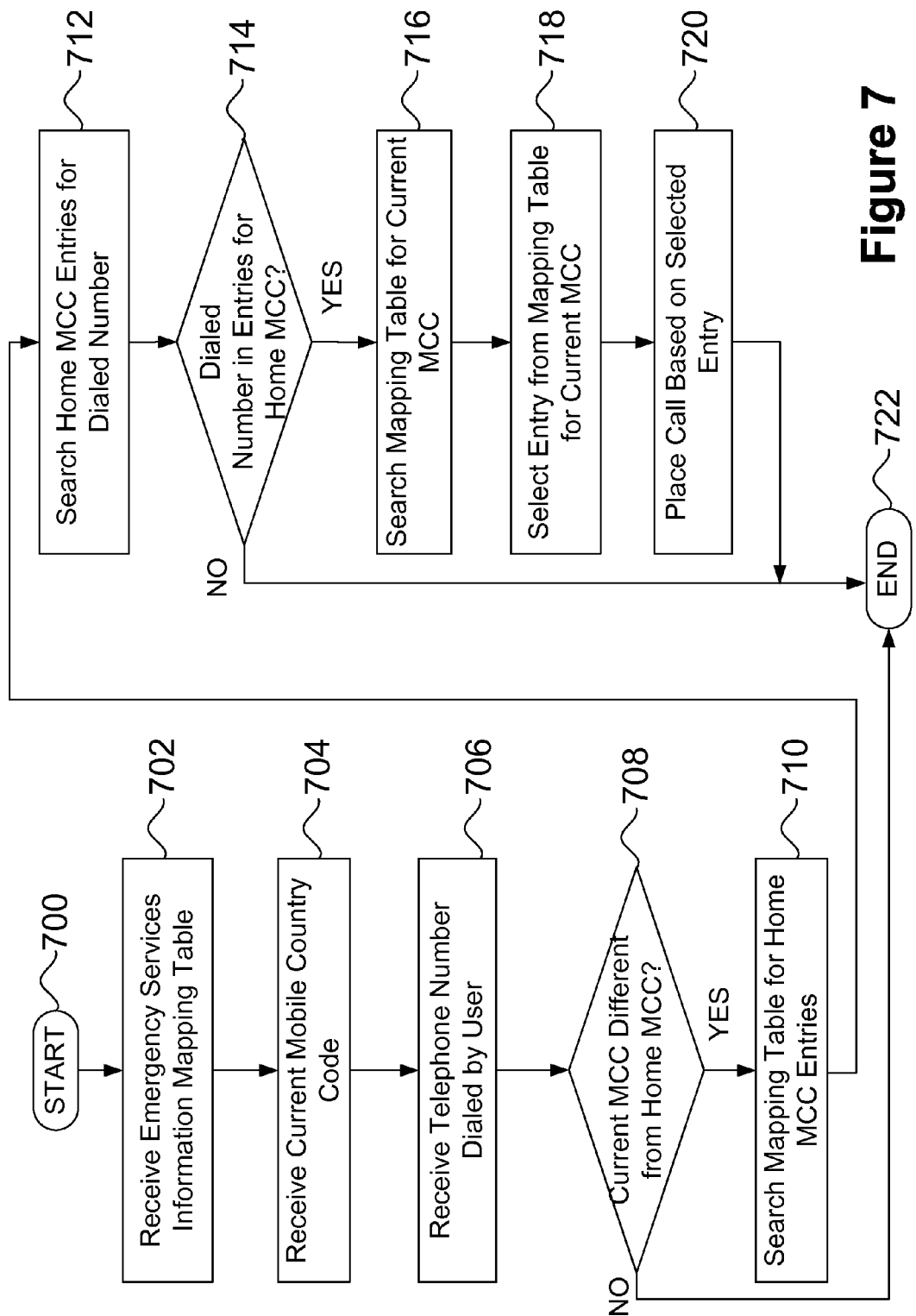
FIG. 7 is a flowchart of a process for provisioning emergency services information according to some embodiments of the present disclosure.

FIG. 7 is a flowchart of a process for provisioning emergency services information according to some embodiments of the present disclosure. The process of FIG. 7 may be performed by a mobile device, such as mobile device 110 or mobile device 1000. The process starts at block 700.

At block 702, an emergency services information mapping table is received. The emergency services information mapping table may be received as described elsewhere in the present disclosure. For example, the emergency services information mapping table may be received by a mobile device.

At block 704, a current mobile country code is received. This may involve the mobile device receiving a PLMN value broadcast from a base station of a communication network. The mobile device may then extract the MCC value from the PLMN value. The mobile device may then store or otherwise treat this MCC value as a current MCC value.

At block 706, a telephone number dialed by a user is received. This may involve the mobile device receiving a telephone number dialed by the user. The user may have entered the telephone number on a keypad of the mobile device. The user may have then pressed "Call" or "Send" or taken some other action to place a telephone call to the dialed telephone number. Instead of directly placing a call to the dialed telephone number, the mobile device may receive the dialed telephone number and perform the other blocks of the flowchart of this figure.

At block 708, a determination is made as to whether the current MCC value is the same as or different from a home MCC value. The home MCC value may be stored on the mobile device as discussed elsewhere in the present disclosure. If the current MCC value and the home MCC value are not different, then the process ends at block 722. In this case, the use of the emergency services information mapping table may not be necessary as the user may have dialed a telephone number that is valid in the current geographic area. If the current MCC value and the home MCC value are different, then the process continues at block 710. In this case, the mobile device is not in the user's home country, so use of the emergency services information mapping table may be necessary.

At block 710, the emergency services information mapping table is searched for entries corresponding to the home MCC value. This may involve searching the emergency services information mapping table for any entries that have an MCC value that is the same as the home MCC. The performance of this block may result in the selection of one or more entries of the emergency services information mapping table with an MCC value matching the home MCC value. These entries may be referred to as the home MCC entries.

At block 712, the home MCC entries are searched for an entry having an emergency services telephone number that is the same as the dialed telephone number. The performance of this block may result in the selection of a single entry of the emergency services information mapping table. If such an entry is found, then the user has dialed an emergency services telephone number for his home country. For that entry, the emergency services type value may be noted as corresponding to the dialed number.

At block 714, a determination is made as to whether an entry was found in the home MCC entries with an emergency services telephone number that is the same as the dialed telephone number. This block may involve determining whether the searching of block 712 resulted in finding an entry or not finding an entry. If no such entry was found, then the process ends at block 722. In this case, the user has not dialed an emergency services telephone number for his home country, so further use of the emergency services information mapping table may not be necessary. If such an entry is found as part of block 712, then the process continues at block 716. In this case, the user has dialed an emergency services telephone number for his home country. Further, it was already determined that the user is in a country different than his home country. Therefore, it may be necessary to use the emergency services information mapping table to place a call to emergency services in the current geographic area.

At block 716, the emergency services information mapping table is searched for entries have an MCC value that is the same as the current MCC value. In this way, the search can be performed to find all entries having an emergency services telephone number that is valid in the current geographic area where the mobile device is located. Each such entry can be considered as a candidate for selection as the number to be dialed.

At block 718, one entry of the set of candidate entries is selected. Based on a set of entries being found having an MCC value that is the same as the current MCC value, one or more entries may be valid for the current geographic area. As such, one of those entries may be selected, so that a telephone call may be placed to the corresponding emergency services telephone number. This selection may be performed in a variety of ways. A random entry from the candidate entries may be chosen. In some embodiments, selection may be performed according to techniques described elsewhere in the present disclosure (see next figure).

At block 720, a telephone call is placed to the emergency services telephone number for the selected entry. In some embodiments, this may involve placing a standard telephone call to the selected emergency services telephone number. In some embodiments, additional information may be included in the call setup information, as described elsewhere in the present disclosure.

The process ends at block 722.

Figure 8:
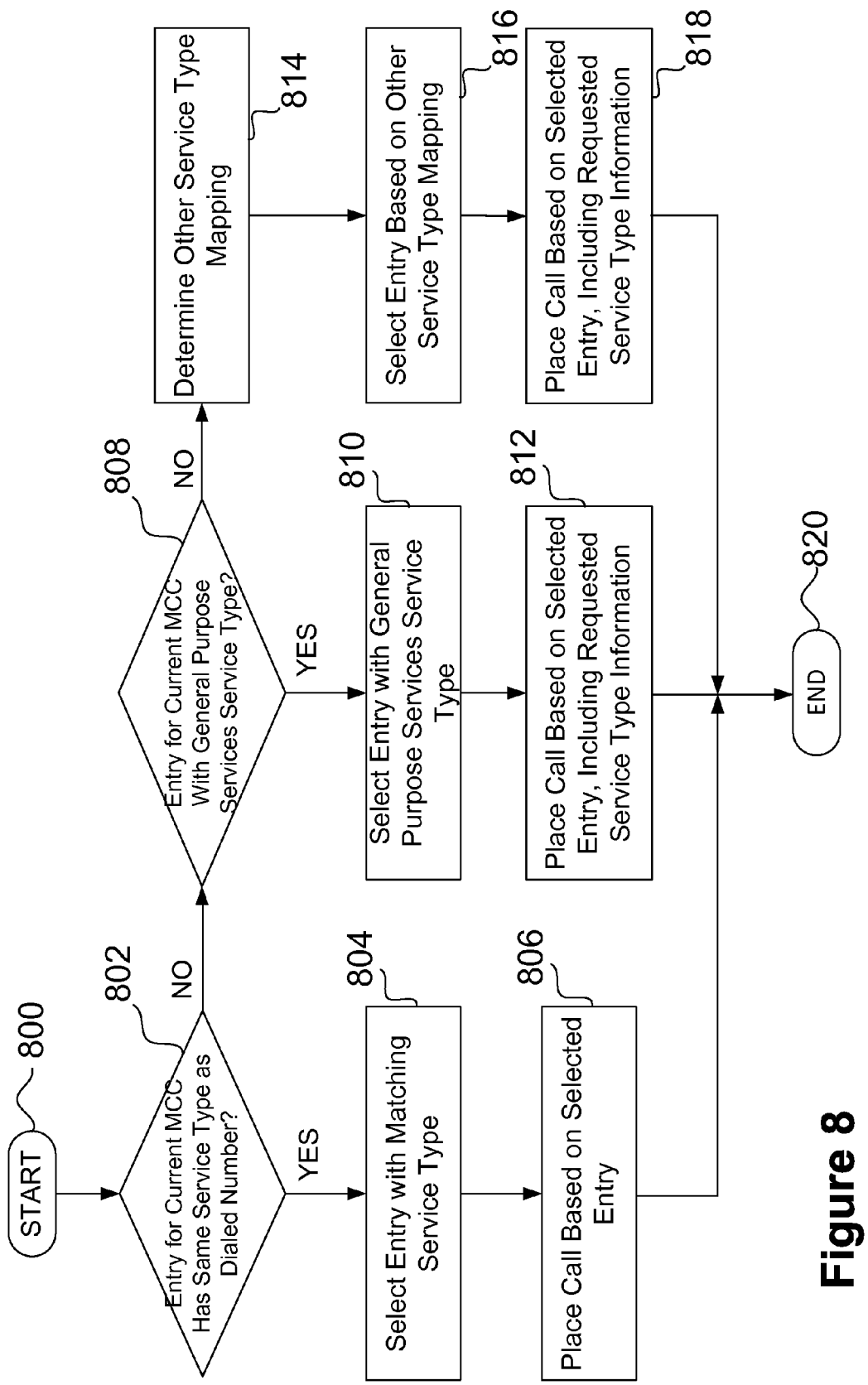
FIG. 8 is a flowchart of a process for provisioning emergency services information according to some embodiments of the present disclosure.

FIG. 8 is a flowchart of a process for provisioning emergency services information according to some embodiments of the present disclosure. The process of FIG. 8 may be performed by a mobile device, such as mobile device 110 or mobile device 1000. The process of this figure may be used to perform selection of an entry from the emergency services information mapping table for the current MCC and placing of a call based on the selected entry, as described with respect to blocks 718 and 720 of the previous figure. The process starts at block 800. The process may begin with a set of candidate entries, where each candidate entry has an MCC value that is the same as the current MCC value.

At block 802, a determination is made as to whether an entry of the candidate entries has an emergency services type value that is the same as the emergency services type value for the dialed telephone number. As discussed with respect to the previous figure, an emergency services type value can be determined for the telephone number dialed by the user. If an entry of the candidate entries has the same emergency services type value, then the process continues at block 804. If no entry of the candidate entries has the same emergency services type value as that for the dialed telephone number, then the process continues at block 808.

At block 804, an entry of the candidate entries having the same emergency services type value as the dialed number is selected. In this case, an entry has been found for the current MCC that provides the same type of emergency services as that which the user tried to contact using the dialed telephone number. Therefore, this entry will be selected for placing a call.

At block 806, a call is placed to the emergency services telephone number for the entry selected at block 804. The placing of this call may be performed as a standard call placement as if the user had himself dialed the selected emergency services telephone number. The process then ends at block 820.

At block 808, a determination is made as to whether an entry of the candidate entries has an emergency services type value of general purpose services. At this block, it has already been determined at block 802 that no emergency services telephone number for the current MCC exists with an exact match for the emergency services type of the dialed telephone number. Therefore, the next choice is to select an entry for a general purpose services telephone number, since such an emergency services telephone number may be able to respond to a wide variety of emergency situations. If an entry of the candidate entries has an emergency services type value of general purpose services, then the process continues at block 810. If no entry of the candidate entries has an emergency services type value of general purpose services, then the process continues at block 814.

At block 810, an entry of the candidate entries having an emergency services type value of general purpose emergency services is selected.

At block 812, a call is placed to the emergency services telephone number for the entry selected at block 810. The placing of this call may be performed using an additional requested service type information as part of the call setup information. The requested service type information may be a simple identifier of the emergency services type value for the dialed telephone number. For instance, the requested service type information may be a two, three, four, or more bit value. For a three bit requested service type information value, some of the values may be: 001 for police, 010 for ambulance, 011 for fire, 100 for poison, 101 for traffic police, etc. The process then ends at block 820.

At block 814, another service type mapping is determined. In this situation, neither an entry with the same emergency services type as the dialed number nor an entry with a general purposes services emergency services type has been found. Therefore, a mapping between different emergency services types may be used to determine the best entry of the candidate entry to choose. An exemplary emergency services type mapping is shown in the next figure.

At block 816, an entry of the candidate entries is selected using the emergency services types mapping.

At block 818, a call is placed to the emergency services telephone number for the entry selected at block 816. The placing of this call may be performed using an additional requested service type information as part of the call setup information. The requested service type information may be provided as that described above with respect to block 812. The process then ends at block 820.

Figure 9:
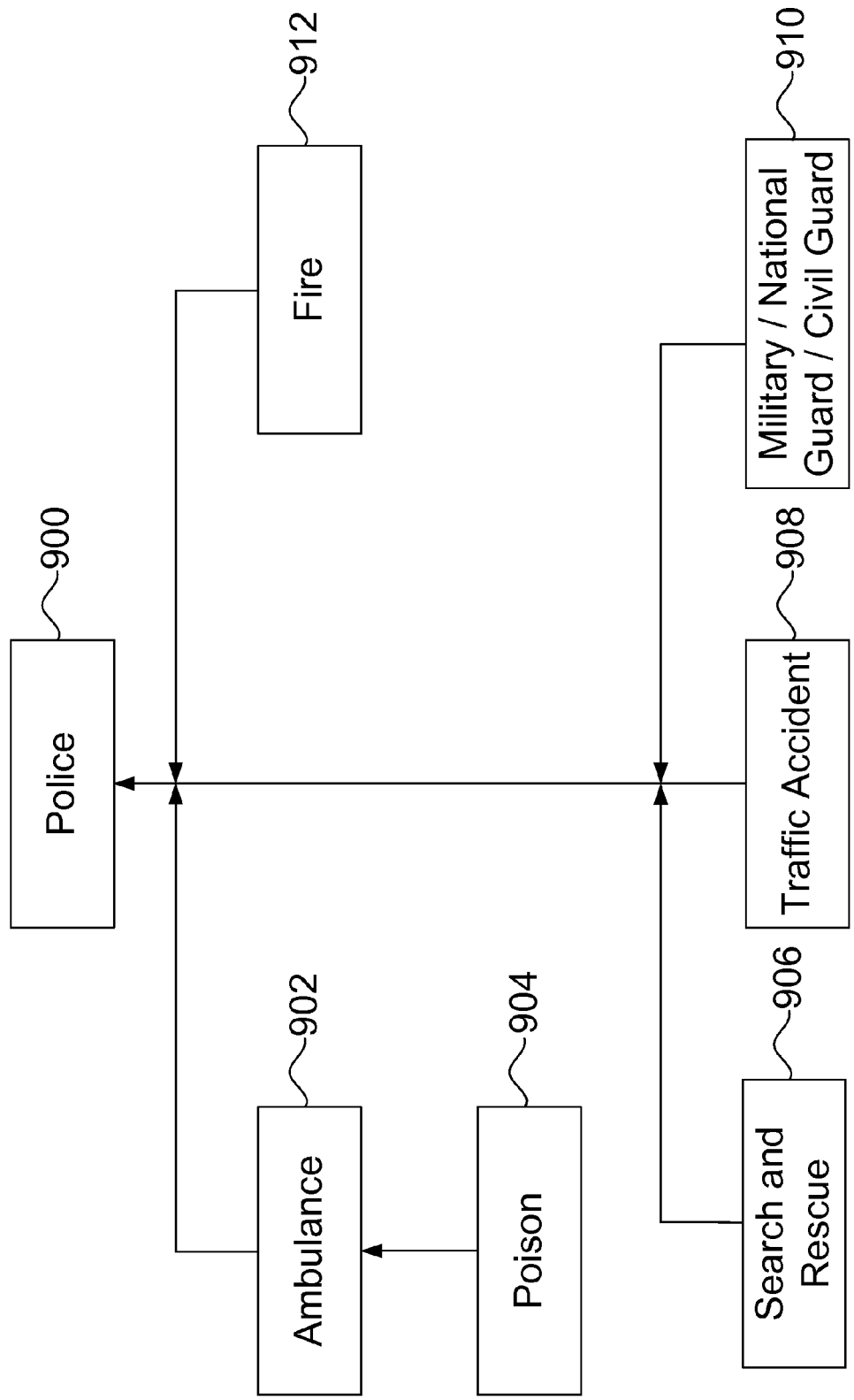
FIG. 9 is a block diagram showing a mapping of emergency services types according to some embodiments of the present disclosure.

FIG. 9 is a block diagram showing a mapping of emergency services types according to some embodiments of the present disclosure. Blocks 900, 902, 904, 906, 908, 910, and 912 are shown. The mapping of emergency services types may be used in order to select an entry of candidate entries for placing a telephone call to emergency services, such as described with respect to block 814 and block 816 of the previous figure. As shown in the figure, the mapping of emergency services types may provide a mapping from emergency services types to other emergency services types. The mapping of emergency services types may be used by first finding a block for the emergency services type of the dialed telephone number. Then, the paths are followed from that block to another block. The emergency services type of that destination block is then used. An entry of the candidate entries having the destination block emergency services type is then selected. If no such entry exists in the candidate entries, then the mapping of emergency services types is used again, moving from the destination block along a path to another block. This process can be repeated until an entry of the candidate entries is successfully selected.

As an example, the mapping of emergency services types may be used where the dialed telephone number has an emergency services type of poison. This may mean that the user dialed an emergency services telephone number corresponding to a poison hotline for his home country. However, it may be that no emergency services telephone number exists for poison or for general purpose services in the current geographic area. Therefore, the mapping of emergency services types is used starting at block 904. The path is followed, which leads to a destination block of block 902. Block 902 corresponds to an emergency services type of ambulance. Therefore, if an entry of the candidate entries has an emergency services type of ambulance, then it will be selected. If no entry exists for an emergency services type of ambulance, then the mapping of emergency services types is used again, following the path to block 900 for police. Therefore, if an entry of the candidate entries has an emergency services type of police, then it will be selected.

The mapping of emergency services types of this figure is only exemplary. Mappings of emergency services types with different features may be used in some embodiments of the present disclosure. For example, more blocks for more emergency services types may be used in the mapping of emergency services types. As another example, more paths between the blocks may be used. A variety of other modifications to mapping of emergency services types may be used in various embodiments of the present disclosure.

In some embodiments, various indicators may be provided to the user of the mobile device to indicate that the techniques of the present disclosure are being implemented. For example, where the dialed telephone number is mapped to a different emergency services telephone number for the current geographic area, various visual outputs on a screen of the mobile device may be used. For instance, where a dialed telephone number of 911 is mapped to 112, the following visual indicator may be presented: "911 not valid for current geographic area. 112 is being dialed . . . " A variety of other indicators may be used in various embodiments of the present disclosure.

Figure 10:
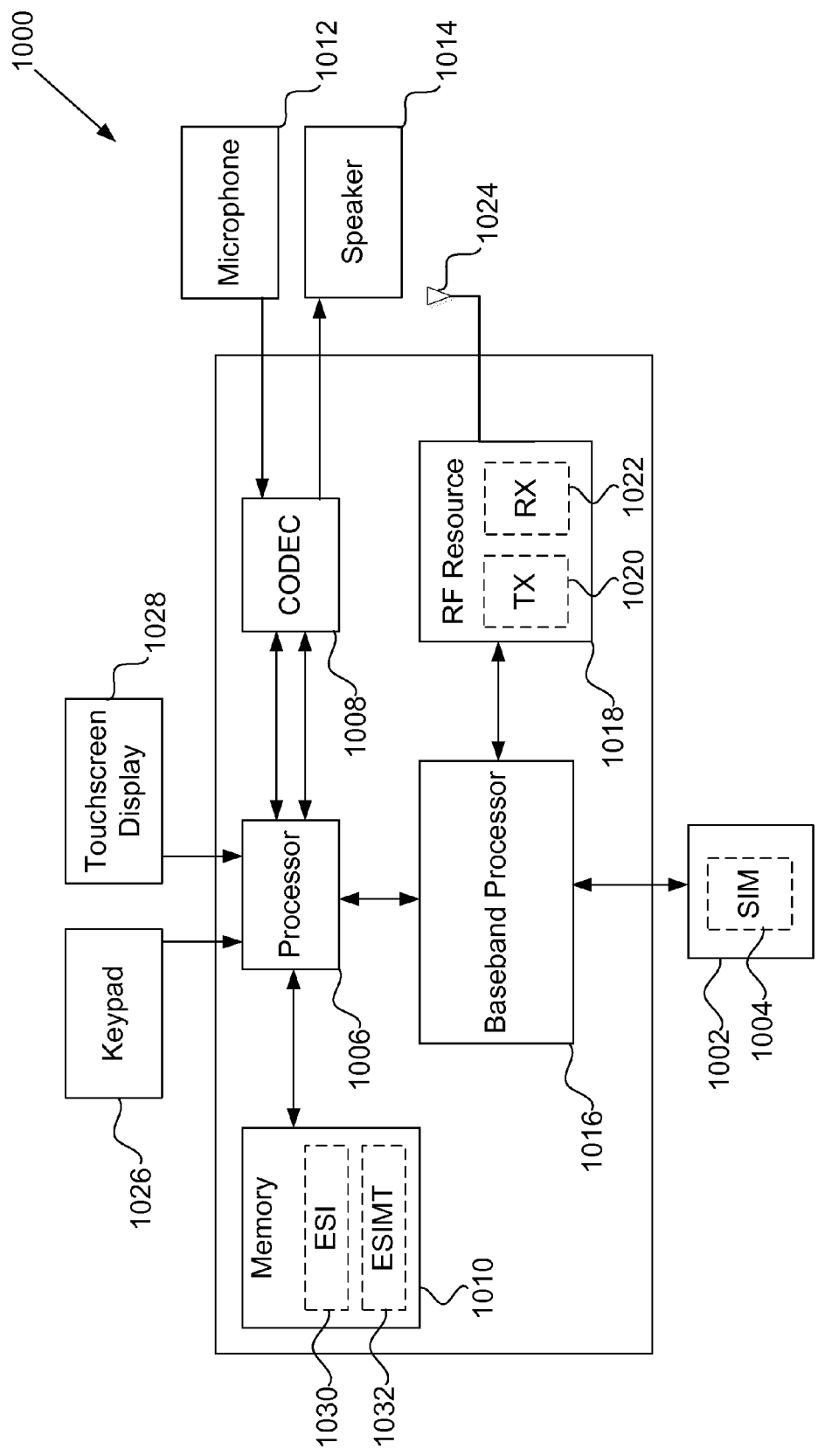
FIG. 10 is a functional block diagram of a telephone device according to various embodiments.

FIG. 10 is a functional block diagram of a mobile device 1000 according to various embodiments of the disclosure. In some embodiments, mobile device 1000 may be used as a mobile device as described previously herein.

Mobile device 1000 may include an identity module interface 1002. Identity module interface 1002 may receive an identity module 1004 associated with a subscription for a user of mobile device 1000. In some embodiments, identity module interface 1002 may be a SIM interface and identity module 1004 may be a SIM card.

Mobile device 1000 may include at least one processor 1006. In some embodiments, processor 1006 may be provided as a general purpose processor. Processor 1006 may include any suitable data processing device, such as a general purpose processor (e.g., a microprocessor). In the alternative, processor 1006 may be any suitable electronic processor, controller, microcontroller, or state machine. Processor 1006 may also be implemented as a combination of computing devices, e.g., a combination of a DSP and a microprocessor, a plurality of microprocessors, at least one microprocessor in conjunction with a DSP core, or any other such configuration.

Mobile device 1000 may include a coder/decoder (CODEC) 1008 coupled to processor 1006. CODEC 1008 may in turn be coupled to one or more user interface devices. The user interface device may include a display and a user input device. In various embodiments, the display may include any suitable device that provides a human-perceptible visible signal, audible signal, tactile signal, or any combination thereof. The display may include, but is not limited to, a touchscreen, LCD, LED, CRT, plasma, other suitable display screen, audio speaker 1014, other audio generating device, combinations of the preceding, and the like. In various embodiments, the user input device may include any suitable device that receives input from the user. The user input device may include, but is not limited to, one or more manual operators (such as, but not limited to a switch, button, touchscreen, knob, slider, or the like), microphone 1012, camera, image sensor, combinations of the preceding, and the like.

Mobile device 1000 may include at least one memory 1010 coupled to processor 1006. Memory 1010 may be a non-transitory processor-readable storage medium that stores processor-executable instructions. This medium may include, but is not limited to, random access memory ("RAM"), read only memory ("ROM"), floppy disks, hard disks, dongles, USB connected memory devices, combinations of the preceding, or the like. Memory 1010 may store an operating system ("OS") as well as user application software and executable instructions.

Mobile device 1000 may include at least one baseband processor 1016 coupled to processor 1006. Baseband processor 1016 may be a baseband modem processor. Each identity module in mobile device 1000 (e.g., identity module 1004) may be associated with baseband-RF resources. The RF resources may include at least one baseband-RF resource chain. The baseband-RF resource chain may include baseband processor 1016, which may perform baseband/modem functions for communications on identity module 1004. The baseband-RF resource chain may also include one or more amplifiers and radios, such as RF resource 1018. RF resource 1018 may be a transceiver that performs transmit/receive functions for mobile device 1000. RF resource 1018 may include transmitter 1020 and receiver 1022. RF resource 1018 may include separate transmit and receive circuitry, or it may include a transceiver that combines transmitter and receiver circuitry. RF resource 1018 may be coupled to a wireless antenna 1024 for transmitting and receiving wireless signals across a wireless medium. RF resource 1018 may further be coupled to baseband processor 1016.

In some embodiments, processor 1006, memory 1010, baseband processor 1016, and RF resource 1018 may be included in mobile device 1000 as a system-on-chip. In some embodiments, identity module 1004 and identity module interface 1002 may be external to the system-on-chip. Further, various input and output devices may be coupled to components on the system-on-chip, such as interfaces or controllers. Example user input components suitable for use in mobile device 1000 may include, but are not limited to, a keypad 1026, touchscreen display 1028, and microphone 1012.

In some embodiments, keypad 1026, touchscreen display 1028, microphone 1012, or a combination thereof may receive a request to initiate an outgoing call. For example, touchscreen display 1028 may receive a selection of a contact from a contact list or receive a telephone number. As another example, the request to initiate the outgoing call may be in the form of a voice command received via microphone 1012. Interfaces may be provided between the various software modules and functions in mobile device 1000 to enable communication between them, as is known in the art.

In some embodiments (not shown), mobile device 1000 may include, among other things, additional identity modules (e.g., additional SIM cards), additional identity module interfaces (e.g., additional SIM interfaces), a plurality of RF resources, and additional antennae for connecting to additional mobile networks.

In particular embodiments, memory 1010 may be configured to store processor-executable instructions for performing various features related to the present disclosure, such as emergency services instructions 1030. In particular embodiments, memory 1010 may be further configured to store emergency services information mapping table 1032.

In particular embodiments, emergency services instructions 1030 may be effective to cause mobile device 1000 to receive emergency services information mapping table 1032. For example, emergency services instructions 1030 may cause receiver 1022 to receive the emergency services information mapping table 1032. As another example, emergency services instructions 1030 may cause mobile device 1000 to receive emergency services information mapping table 1032 by causing processor 1006 to retrieve information of emergency services information mapping table 1032 from identity module 1004, in cases where emergency services information mapping table 1032 is stored on identity module 1004. As another example, emergency services instructions 1030 may cause mobile device 1000 to receive emergency services information mapping table 1032 by causing processor 1006 to retrieve information of emergency services information mapping table 1032 from memory 1032, in cases where emergency services information mapping table 1032 is stored on memory 1032.

In particular embodiments, emergency services instructions 1030 may be effective to cause mobile device 1000 to store emergency services information mapping table 1032. For example, based on detecting the presence of emergency services information mapping table information on an external storage device coupled to mobile device 1000, emergency services instructions 1030 may cause processor 1006 to transfer the emergency services information mapping table information to memory 1010 and store it as emergency services information mapping table 1032. As another example, based on detecting the reception of data representing an emergency services information mapping table update by RF resource 1018, emergency services instructions 1030 may cause processor 1006 to transfer the data to memory 1010 and store it as part of or all of emergency services information mapping table 1032.

In particular embodiments, emergency services instructions 1030 may be effective to cause mobile device 1000 to use emergency services information mapping table 1032 in order to initiate a telephone call to emergency services. For example, based on receiving from touchscreen display 1028 a telephone number dialed by the user, emergency services instructions 1030 may cause processor 1006 to search emergency services information mapping table 1032 for entries corresponding to a home MCC value. The home MCC value may be stored in memory 1010, on identity module 1004, or elsewhere. Emergency services instructions 1030 may further cause processor 1006 to search the home MCC entries for the dialed telephone number. If the dialed number is found, then emergency services instructions 1030 may cause processor 1006 to search emergency services information mapping table 1032 for entries corresponding to a current MCC value. The current MCC value may be stored in memory 1010, on identity module 1004, or elsewhere. Emergency services instructions 1030 may cause processor 1006 to select one of the entries for the current MCC value. Emergency services 1030 may cause processor 1006 to initiate a telephone call to a telephone number provided in the selected current MCC entry, using baseband processor 1016, RF resource 1018, and antenna 1024 to perform the communications needed to initiate the telephone call.

In particular embodiments, emergency services instructions 1030 may be effective to cause mobile device 1000 to use emergency services information mapping table 1032 to perform various parts of exemplary processes described elsewhere in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

The invention claimed is:

1. A method for provisioning of emergency services information, the method comprising:
   receiving, by a mobile device, an emergency services information mapping table, the emergency services information mapping table comprising a plurality of entries, each entry of the plurality of entries comprising a mobile country code value, an emergency services telephone number value, and an emergency services type value, the plurality of entries comprising a first entry corresponding to a home mobile country code, a second entry corresponding to a current mobile country code, and a third entry corresponding to the current mobile country code;

retrieving, by the mobile device, information from the emergency services information mapping table in response to an input from a user of the mobile device when the home mobile country code is different from the current mobile country code; and selecting the third entry when the emergency services type value of the second entry does not match the emergency services type value of the first entry, the third entry having the emergency services type value that is a general purpose services type value.

2. The method of claim 1, wherein the input is a telephone number entered by the user of the mobile device, wherein the first entry has an emergency services telephone number value which is the telephone number entered by the user, and wherein the second entry has an emergency services telephone number value which is a telephone number to be called when the emergency services type value of the second entry matches the emergency services type value of the first entry.

3. The method of claim 1, further comprising:

searching the emergency services information mapping table for the second entry that has a current mobile country code value associated with a geographic area in which the mobile device is currently located; and placing a call to a telephone number corresponding to the emergency services telephone number value contained in the selected entry when the emergency services type value of the second entry matches the emergency services type value of the first entry.

4. The method of claim 3, wherein the input is a telephone number entered by the user, wherein the emergency services type value of the first entry has a value that corresponds to an emergency services type value associated with the phone number entered by the user and a home geographic area associated with the mobile device.

5. The method of claim 4, further comprising:

searching the emergency services information mapping table for the first entry that has the mobile country code value corresponding to the home mobile country code value stored on the mobile device and has the emergency phone number value that matches the phone number entered by the user; and using the emergency services type value in the first entry as the emergency services type value associated with the phone number entered by the user and the home geographic area associated with the mobile device.

6. The method of claim 1, wherein the emergency services information mapping table is provided on the mobile device prior to sale of the mobile device and updated via an emergency services information mapping table update to the mobile device on a communication network.

7. The method of claim 1, wherein the home mobile country code is pre-stored on the mobile device, and the method further comprising:

determining the current mobile country code based on a public land mobile network (PLMN) communicated by a network within range of the mobile device; and comparing the home mobile country code to the current mobile country code.

8. An apparatus for provisioning of emergency services information, the apparatus comprising:

a mobile device having electronic storage comprising an emergency services information mapping table, the emergency services information mapping table comprising a plurality of entries, each entry of the plurality of entries comprising a mobile country code value, an emergency services telephone number value, and an emergency services type value, the plurality of entries comprising a first entry corresponding to a home mobile country code, a second entry corresponding to a current mobile country code, and a third entry corresponding to the current mobile country code, wherein the mobile device is configured to retrieve information from the emergency services information mapping table in response to an input from a user of the mobile device when the home mobile country code is different from the current mobile country code, and wherein the mobile device is configured to select the third entry when the emergency services type value of the second entry does not match the emergency services type value of the first entry, the third entry having the emergency services type value that is a general purpose services type value.

9. The apparatus of claim 8, wherein the input is a telephone number entered by the user of the mobile device, wherein the first entry has an emergency services telephone number value which is the telephone number entered by the user, and wherein the second entry has an emergency services telephone number value which is the telephone number to be called when the emergency services type value of the second entry matches the emergency services type value of the first entry.

10. The apparatus of claim 8, wherein the mobile device is configured to receive the current mobile country code value from a communication network, the current mobile country code value corresponding to a geographic area in which the mobile device is currently located, wherein the mobile device is configured to receive a telephone number entered by the user of the mobile device, wherein the mobile device is configured to determine that the current mobile country code value is different from the home mobile country code value stored on the mobile device, and wherein the mobile device is configured to search the emergency services information mapping table for the first entry, wherein the mobile country code value contained in the first entry is the same as the home mobile country code value.

11. The apparatus of claim 10, wherein the mobile device is configured to determine that the emergency services telephone number value contained in the first entry is the telephone number entered by the user, and wherein the mobile device is configured to search the emergency services information mapping table for the second entry, wherein the mobile country code value contained in the second entry is the same as the current mobile country code value.

12. The apparatus of claim 11, wherein the mobile device is configured to place a call to an emergency services telephone number value contained in the third entry.

13. The apparatus of claim 12, wherein the mobile device is configured to place the call to the emergency services telephone number value contained in the third entry in a way that comprises providing requested service type information in a call setup information for the call to the emergency services telephone number value contained in the third entry.

14. An apparatus for provisioning of emergency services information, the apparatus comprising:
means for receiving, by a mobile device, an emergency services information mapping table, the emergency services information mapping table comprising a plurality of entries, each entry of the plurality of entries comprising a mobile country code value, an emergency services telephone number value, and an emergency services type value, the plurality of entries comprising a first entry corresponding to a home mobile country code, a second entry corresponding to a current mobile country code, and a third entry corresponding to the current mobile country code;
means for retrieving, by the mobile device, information from the emergency services information mapping table in response to an input from a user of the mobile device when the home mobile country code is different from the current mobile country code; and
means for selecting the third entry when the emergency services type value of the second entry does not match the emergency services type value of the first entry, the third entry having the emergency services type value that is a general purpose services type value.

15. The apparatus of claim 14, further comprising:
means for receiving, by the mobile device, the current mobile country code value from a communication network, the current mobile country code value corresponding to a geographic area in which the mobile device is currently located;
means for receiving, by the mobile device, a telephone number entered by the user of the mobile device;
means for determining that the current mobile country code value is different from the home mobile country code value stored on the mobile device
means for searching, by the mobile device, the emergency services information mapping table for the first entry, wherein the mobile country code value contained in the first entry is the same as the home mobile country code value.

16. The apparatus of claim 15, further comprising:
means for determining that the emergency services telephone number value contained in the first entry is the telephone number entered by the user; and
means for searching, by the mobile device, the emergency services information mapping table for the second entry, wherein the mobile country code value contained in the second entry is the same as the current mobile country code value.

17. The apparatus of claim 16, further comprising:
means for placing, by the mobile device, a call to the emergency services telephone number value contained in the third entry.

18. A non-transitory computer-readable medium storing computer executable code for provisioning of emergency services information, comprising code to:
receive, by a mobile device, an emergency services information mapping table, the emergency services information mapping table comprising a plurality of entries, each entry of the plurality of entries comprising a mobile country code value, an emergency services telephone number value, and an emergency services type value, the plurality of entries comprising a first entry corresponding to a home mobile country code, a second entry corresponding to a current mobile country code, and a third entry corresponding to the current mobile country code;
retrieve, by the mobile device, information from the emergency services information mapping table in response to an input from a user of the mobile device when the home mobile country code is different from the current mobile country code; and
select, by the mobile device, the third entry when the emergency services type value of the second entry does not match the emergency services type value of the first entry, the third entry having the emergency services type value that is a general purpose services type value.

19. The non-transitory computer-readable medium of claim 18, further comprising code to:
receive the current mobile country code value from a communication network, the current mobile country code value corresponding to a geographic area in which the mobile device is currently located;
receive a telephone number entered by the user of the mobile device;
determine that the current mobile country code value is different from the home mobile country code value stored on the mobile device; and
search the emergency services information mapping table for the first entry, wherein the mobile country code value contained in the first entry is the same as the home mobile country code value.

20. The non-transitory computer-readable medium of claim 19, further comprising code to:
determine that the emergency services telephone number value contained in the first entry is the telephone number entered by the user; and
search the emergency services information mapping table for the second entry wherein the mobile country code value contained in the second entry is the same as the current mobile country code value.

21. The non-transitory computer-readable medium of claim 20, further comprising code to:
place a call to the emergency services telephone number value contained in the third entry.

* * * * *